Patented Nov. 24, 1942

2,302,885

UNITED STATES PATENT OFFICE 2,302,885

HYDROHALIDES OF SUBSTITUTED ISO-THIO-UREAS AND A PROCESS OF PREPARING THEM

Ludwig Orthner and Gerhard Balle, Frankfort-on-the-Main, Georg Dittus, Ludwigshafen-on-the-Rhine, and Hermann Wagner, Frankfort-on-the-Main, Germany, assignors, by mesne assignments, to General Aniline & Film Corporation, New York, N. Y., a corporation of Delaware No Drawing. Application December 3, 1938, Serial No. 243,796. In Germany December 3, 1937

5 Claims. (Cl. 260—399)

The present invention relates to hydrohalides of substituted iso-thio-ureas and a process of preparing them.

We have found that halogen-methyl compounds the $CH_2$-halogen-group of which is directly bound to the polar group of a carboxylic acid amide, or a thio-carboxylic acid amide, a urethane, a urea, an amidine, an imidazoline or an imino-ether containing at least 4 carbon atoms, or is bound, in ortho- or para-position with respect to the OH-group, to a hydroxy-phenyl-radical substituted in the nucleus, easily react with thio-urea or a derivative thereof so as to form hydrohalides of substituted thio-urea.

The halogen-methyl compounds correspond with the general formula:

$$R.CH_2.hal$$

wherein hal is halogen and R represents the radical, containing at least 4 carbon atoms, of a member of the group consisting of carboxylic acid amides, thio-carboxylic acid amides, urethanes, ureas, amidines, imidazolines, imino-ethers, hydroxy-benzenes substituted in the nucleus.

In the case of the hydroxy-benzenes substituted in the nucleus, the $CH_2$-halogen-group is present in ortho- or para-position to the hydroxyl group, as has already been stated. In case R represents one of the remaining radicals mentioned above, the $CH_2$-halogen-group is directly bound to the polar group and is, therefore, in the case of carboxylic acid amides, thio-carboxylic acid amides, urethanes, ureas, amidines and imidazolines, fixed at a nitrogen atom and in the imino-ethers at an oxygen or nitrogen atom.

It is evident from the above statements that the polar group at which the $CH_2$-halogen-group is directly fixed, has one of the following constitutions:

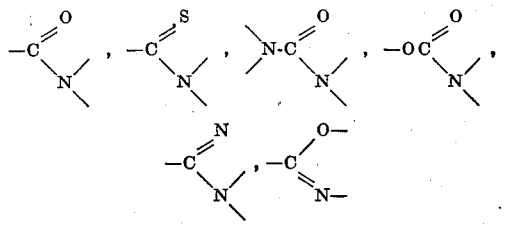

The kind of the halogen atom is less important in this reaction. As regards the halogen-methyl compounds of the amidines, imidazolines, ureas and imino-ethers, it cannot be indicated with certainty, at which of the two hetero atoms of the polar group the halogen-methyl radical is bound.

The reaction of the halogen-methyl compound with thio-urea or a derivative of thio-urea in most cases occurs merely by mixing the two reaction components in a kneader or in another suitable device. In some cases it may be necessary to heat both components at a raised temperature, or the reaction may in general be accelerated or completed by heating the components at a raised temperature. The maximum temperature to be applied is generally about 120° C. With some of the halogen-methyl compounds to be used according to the present invention, the reaction temperature may, however, be considerably lower.

The reaction may also be carried out in the presence of a solvent, such as methylene chloride, carbon tetrachloride, benzene, toluene, xylene, solvent naphtha, benzine and ethyl acetate. If a solvent is used, the final product may be isolated by filtering with suction or centrifuging the solvent, or the latter may be removed by distillation, preferably under reduced pressure.

The following halogen-methyl compounds are, for instance, suitable for the reaction with thio-urea or a derivative thereof according to the present process: halogen-methyl compounds of carboxylic acid amides or urethanes such as N-butyl-N-chloromethyl-acetic acid amide, N-dodecyl-N-chloromethyl-acetic acid amide, N-methyl-N-chloromethyl-lauric acid amide, N-chloromethyl-stearic acid amide, N-chloromethyl-isooctylphenoxy-acetic acid amide, N-chloromethyl-hydroxy-stearic acid amide (the hydroxy-stearic acid being prepared by hardening castor oil), the chloromethyl compound of dichloro-stearic acid amide, the chloromethyl compound of lauryl-ureido-stearic acid amide (obtained by causing dodecyl-isocyanate to act upon the amide of hardened ricinoleic acid), N-stearyl-N-chloromethyl-urethane, N-chloromethyl-O-dichloro-stearyl-urethane, stearyl-chloromethyl-imino-ether, (prepared by causing formaldehyde and hydrochloric acid to act upon stearic acid nitrile), octadecyl-chloromethyl-urea, chloromethyl compounds of aromatic hydroxyl compounds, such as chloromethyl-cresol, chloromethyl-iso-dodecyl-phenol and the chloromethyl compounds of amidines, imidazoles and imidazolines.

Besides thio-urea, there may be used an alkyl, aryl, aralkyl or cycloalkyl derivative thereof, for instance ethyl-thio-urea, benzyl-thio-urea, triethyl-thio-urea, diphenyl-thio-urea and ethylene-thio-urea.

The new products are in general solid substances which are in many cases soluble in water and in other cases are capable of being emulsified with water. Those compounds which can be emulsified with water are usually soluble in water at a raised temperature.

The compounds obtained by the present process are to be considered as iso-thiuronium salts. They are distinguished by their relatively low stability on heating and when in solution. By this property they are essentially distinguished from the iso-thio-urea compounds described in U. S. Patent No. 2,051,947, filed December 12, 1933, for "Wetting, cleansing, and emulsifying agents and method of producing the same" in the name of Heinz Hunsdiecker et al.

The new products may be used in textile processing, especially as intermediate products for the peparation of textile adjuvants.

The following examples serve to illustrate the invention, but they are not intended to limit it thereto. The parts are by weight:

(1) 15 parts of pulverized thio-urea are gradually mixed in a kneader, at room temperature, with 22 parts of stearic acid chloromethyl-amide obtained by causing paraformaldehyde and hydrochloric acid to act upon stearic acid amide in a benzene solution, drying the solution by means of calcium chloride and distilling the solvent under reduced pressure. The pulverulent reaction product having the formula:

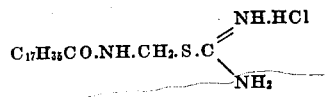

is washed with ether, in order to remove any adhering impurities, and dried under reduced pressure. The salt dissolves in acetone, methanol or water to a feebly turbid solution. Its solutions in water have a strong foaming action. They gradually become turbid on prolonged standing, and this more rapidly in the heat or at an enhanced pH-value. On heating even to 80° C., the product begins to distinctly decompose before melting.

(2) 30 parts of stearic acid amide and 7 parts of paraformaldehyde in about 90 parts of methylene chloride are brought into solution by introduction of hydrogen chloride at about 25° C. The mixture is then dried by means of calcium chloride and filtered. In order to dissolve the chloromethyl compound which still contains an excess of hydrochloric acid, 18 parts of pulverized thiourea are gradually introduced, while stirring, at a temperature of 25° C.–30° C. After some hours, the solvent is distilled first at ordinary pressure and finally under reduced pressure. The calculated amount of the stearyl-amino-methyl-thiouronium chloride is obtained in the form of a powder as in Example 1. It contains about 5% of impurities, hardly soluble in methanol, of the probable formula: $(C_{17}H_{35}CO.NH)_2CH_2$, from which it may be freed by cautious recrystallization from methanol.

If the hydrochloric acid is replaced by hydrobromic or hydrofluoric acid, the corresponding bromide or fluoride is obtained which salts, as regards appearance, solubility and decomposability, are nearly completely similar to the chloride.

(3) 34 parts of dichlorostearic acid amide, prepared by known methods from commercial oleic acid, are dissolved in about 100 parts of toluene together with 6 parts of paraformaldehyde and transformed, in known manner, into the chloromethyl compound, by introduction of hydrogen chloride. After drying the solution by means of calcium chloride and filtering it, 18 parts of pulverized thiourea are slowly introduced at room temperature and the mixture is finally heated for some time at 40° C.–45° C. After distilling the solvent under reduced pressure, a somewhat sticky powder is obtained which dissolves in alcohol or water to a somewhat turbid solution. Its aqueous solution behaves similarly to that obtained in Example 1.

(4) 50 parts of the N-lauryl-carbamic acid ester of hydroxy stearic acid amide, obtained by condensation of the acid amide of hydrogenated ricinoleic acid with lauryl-isocyanate, in 150 parts of methylene chloride in the presence of 8 parts of paraformaldehyde are transformed into the chloromethyl compound by introduction of hydrogen chloride at about 25° C. The mixture is dried by means of calcium chloride, and 22 parts of thio-urea are then added. After some hours, the solvent is distilled first at ordinary pressure, and finally under reduced pressure. A product which has the following probable constitution:

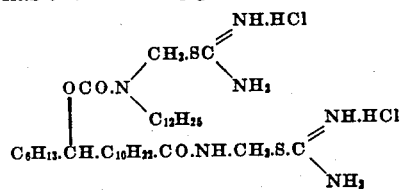

is obtained in the form of a fat- to wax-like mass which, dissolved in water at room temperature, yields a strongly foaming dispersion from which, on heating, the fatty body is separated.

(5) The procedure is the same as indicated in Example 2, 23 parts of N-lauryl-acetamide, obtained from commercial lauryl-amine according to known methods, being substituted for the stearic acid amide. The product of the formula:

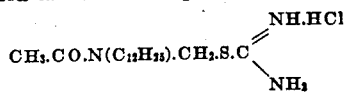

is thus obtained in the form of a crystalline powder which is relatively readily soluble in methanol and water. Its aqueous solutions have a strong foaming action and, on heating, decompose relatively quickly.

(6) If in the process of Example 2, 30 parts of the amide from hardened train oil fatty acid (iodine number: 10–15) are used instead of stearic acid amide and 20 parts of N.N''-triethyl-thio-urea instead of thio-urea, the reaction product being, after complete reaction, filtered with suction or centrifuged, an isothiuronium chloride is obtained, after cautious drying under reduced pressure, in the form of a powder which, when dissolved in methanol or water, quickly decomposes while precipitating insoluble products.

(7) The procedure is the same as indicated in Example 2, the stearic acid amide being, however, replaced by 35 parts of the amide of commercial para-iso-tetradecyl-phenoxy-acetic acid (boiling, under a pressure of 3 mm., at 180° C.–240° C.) prepared by alkaline condensation of para-iso-tetradecyl-phenol with chloracetic acid. A soft mass is obtained which dissolves in methanol and water to a turbid solution. Its aqueous solution displays a high foaming power and is, as regards its stability, very similar to that of Example 1.

(8) 32 parts of O-octodecyl-urethane of the formula $C_{18}H_{37}O.CO.NH_2$ and 7 parts of paraformaldehyde are suspended in about 80 parts of carbon tetrachloride and the suspension is treated, at about 35° C., with hydrogen chloride until a solution has been formed. The solution is dried by means of anhydrous sodium sulfate, filtered, and 18 parts of thio-urea are then gradually added thereto. After about two hours, the main quantity of the carbon tetrachloride is distilled under normal pressure. After drying under reduced pressure, a pulverulent product of the formula:

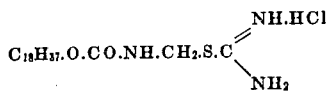

is obtained in a nearly theoretical yield. On heating, the product decomposes at a temperature below 100° C., before completely melting. It dissolves readily in alcohol. Its aqueous solutions have a strong foaming action and are somewhat more stable than those of the product obtained according to Example 1.

(9) From O-ethyl-N-n-butyl-urethane obtained from chloroformic acid ethyl ester and n-butylamine, the chloromethyl compound is prepared by the action of formaldehyde and hydrochloric acid, in a manner analogous to that described in Example 8. After distillation of the solvent in vacuo, the product yields by reaction, in ethyl acetate, with sym.-diphenyl-thio-urea in equimolecular quantities, the iso-thiuronium salt of the probable constitution:

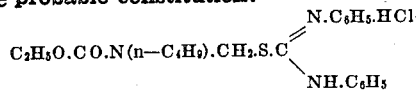

which is obtained in the form of a water-soluble powder.

(10) 31 parts of mono-octodecyl-urea are transformed into the chloromethyl compound as indicated in Example 2 for stearic acid amide. After drying the methylene chloride solution by means of calcium chloride and filtering it, 30 parts of pulverized thio-urea are added and, after thorough mixing, the whole is allowed to stand, at room temperature, for about 14 hours. The reaction mixture is heated for about half-an-hour under reflux, then again allowed to cool and the iso-thiuronium chloride of the probable formula:

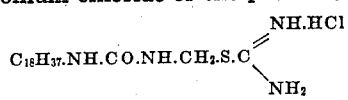

is obtained, by filtering with suction and drying under reduced pressure, in the form of a crystalline powder in a good yield. It dissolves in methanol to a feebly turbid solution. Its aqueous solution has a strong foaming action. By addition of a small amount of a sodium chloride solution, a jelly-like precipitate is formed which, on dilution with water, dissolves again. By addition of a dilute sodium carbonate solution, a jelly-like precipitate is formed which, after neutralizing or feebly acidifying with dilute hydrochloric acid, is no longer soluble in water.

(11) 32 parts of stearyl-amidine hydrochloride, obtained in known manner from the stearyl-imido-methyl ether manufactured from commercially pure stearic acid, are suspended in about 100 parts of carbon tetrachloride together with 6 parts of paraformaldehyde. By introduction of hydrogen chloride at about 20° C. while well stirring, a solution is obtained which is dried by means of calcium chloride. The solution is filtered and then mixed, while stirring at 20° C., with 30 parts of thio-urea. The whole is then further heated after about 14 hours, at 40° C. for half-an-hour. After cooling, it is filtered with suction.

The iso-thiuronium chloride of the following probable formula:

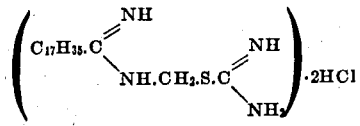

is obtained in the form of a pulverulent product which readily dissolves in methanol and water and the aqueous solution of which displays a strong foaming power.

(12) 35 parts of heptadecyl-imidazoline hydrochloride of the formula

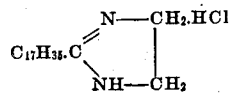

the manufacture of which has been described in French Patent No. 781,001, Example 10, are transformed into the chloromethyl compound as indicated in Example 11 and then condensed with 30 parts of thio-urea. The iso-thiuronium chloride of the probable formula:

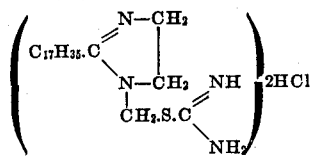

is obtained in the form of a somewhat sticky powder which dissolves in alcohol or water to a somewhat turbid solution.

(13) The chloromethyl compound obtained according to the disclosure of French Patent No. 819,945 from 26 parts of stearic acid nitrile, paraformaldehyde and hydrochloric acid in methylene chloride, is caused to react with 30 parts of thio-urea. There is obtained a compound having the following probable constitution:

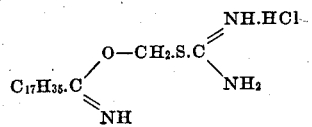

The product is soluble in methanol and water. Its aqueous solutions have a strong foaming action.

If the thio-urea is exchanged for an equimolecular amount of sym.-diphenyl-thio-urea or of N-benzyl-N'-ethyl-thio-urea, iso-thiuronium salts are obtained which, as regards their appearance, are similar to that obtained in the case of thio-urea, but which have a smaller solubility and stability.

(14) 21 parts of commercial isooctyl-phenol (mainly consisting of

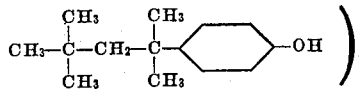

are transformed into the chloromethyl compound according to the process described in Example 1 of U. S. Patent No. 2,165,956. There is obtained a mixture of chloromethyl compounds which essentially contains the para-(alpha.alpha-gamma-gamma-tetramethyl-butyl)-1-hydroxyphenyl-2-chloromethyl compound besides condensation products of probably somewhat higher molecular weight. The product is dissolved in about 120 parts of benzene, and 24 parts of pulverized thio-urea are then added to the solution. After stirring for about 20 hours at 20° C.-25° C., the whole is heated, for about half-an-hour, at a temperature of 40° C.-50° C., and then filtered with suction. After distilling the benzene under reduced pressure, there is obtained, in a nearly theoretical yield, a pulverulent product which corresponds with the formula:

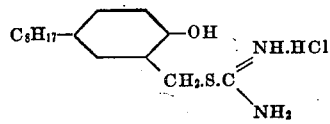

and dissolves in methanol to a clear solution. In water it dissolves to a feebly turbid solution which has a strong foaming power. On boiling or on addition of a sodium carbonate solution, the aqueous solution decomposes while separating sticky products.

If the hydrochloric acid is replaced by hydrobromic or hydrofluoric acid, the corresponding bromide or fluoride is obtained which salts, as regards appearance, solubility and decomposability, are nearly completely similar to the chloride.

(15) 28 parts of an alkyl-phenol, prepared

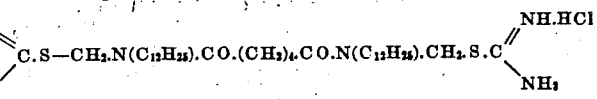

from phenol by means of boron trifluoride and an olefine having an average molecular weight of 195 and the boiling range of 130° C.-260° C. (obtainable by dimerization of an olefine fraction mainly containing isohexylene and isoheptylene which olefine fraction is obtained by dehydration of the corresponding alcohols formed in the catalytic reduction of carbon monoxide), are transformed into the chloromethyl compound as indicated in Example 14. 30 parts of ethylene-thio-urea are then added thereto and the whole is mixed in a mixing device for 6 hours at room temperature.

There is obtained a somewhat resinous, solid product which dissolves in water to a turbid solution having a strong foaming action. Its aqueous solutions have properties similar to those of the product obtained in Example 14.

(16) 21 parts of the di-chloromethyl compound of para-cresol, obtained by the action of gaseous hydrogen chloride upon ortho . ortho'-dimethylol-para-cresol of the formula:

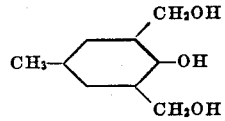

in about 120 parts of methylene chloride are mixed with 30 parts of pulverized thio-urea and the whole is stirred, for about 15 hours, at about 20° C. After heating, for half-an hour, at 40° C., the reaction mixture is filtered with suction in the cold and the residue is dried under reduced pressure.

The crystalline product obtained dissolves in methanol and water to a clear solution. On longer boiling or on addition of a sodium carbonate solution, resinous, insoluble products separate from the aqueous solution.

When replacing the thio-urea by the equimolecular amount of N-benzyl-N'-ethyl-thio-urea, a product is obtained which, as to its appearance, is similar to that obtained with thio-urea, but dissolves more difficultly in water and has a higher tendency to decompose.

(17) 29 parts of the amide of para-n-dodecyl-benzoic acid, obtained by the process of U. S. Patent No. 2,195,198 are transformed into the chloromethyl compound and condensed with thio-urea as indicated in Example 2. After drying under reduced pressure, there is obtained a soft product which, as regards solubility and behavior in aqueous solutions, is very similar to the product obtained from stearic acid amide.

(18) From 44 parts of adipic acid di-laurylamide, 12 parts of paraformaldehyde, hydrogen chloride and 30 parts of thio-urea in methylene chloride there is obtained, in the manner indicated in Example 2 for stearic acid amide, a salve-like product which corresponds with the formula:

$$\text{HCl.NH}\diagdown\text{C.S}-\text{CH}_2.\text{N}(\text{C}_{12}\text{H}_{25}).\text{CO.}(\text{CH}_2)_4.\text{CO.N}(\text{C}_{12}\text{H}_{25}).\text{CH}_2.\text{S.C}\diagup\text{NH.HCl}$$
$$\text{H}_2\text{N}\diagup\qquad\qquad\qquad\qquad\qquad\qquad\qquad\qquad\diagdown\text{NH}_2$$

and displays a relatively good solubility in alcohol and water.

We claim:

1. The process which comprises transforming, by means of formaldehyde and a hydrogen halide, a member of the group consisting of carboxylic acid amides, thio-carboxylic acid amides, urethanes, ureas, this compound containing a radical with at least 4 carbon atoms, into its halogen-methyl compound, and causing the halogen-methyl compound thus obtained to react with a member of the group consisting of thio-urea and thio-urea substituted at a nitrogen atom by a hydrocarbon radical.

2. The process which comprises transforming into the chloromethyl compound stearic acid amide, by means of formaldehyde and hydrogen chloride, and causing the stearic acid chloromethyl amide to react with thio-urea.

3. The isothiuronium hydrohalides obtainable by the process of claim 1.

4. The compound of the following formula:

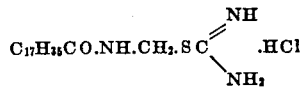

5. The process which comprises reacting stearic acid chloromethyl amide with thio-urea.

LUDWIG ORTHNER.
GERHARD BALLE.
GEORG DITTUS.
HERMANN WAGNER.